US008201409B1

(12) United States Patent
Zakiewicz

(10) Patent No.: US 8,201,409 B1
(45) Date of Patent: Jun. 19, 2012

(54) CLOSED LOOP, HOT DRY ROCK HEAT RECOVERY FLUID

(75) Inventor: Bohdan Zakiewicz, Santa Monica, CA (US)

(73) Assignee: Geothermic Solution LLC, Las Vegas, NV (US)

( * ) Notice: Subject to any disclaimer, the term of this patent is extended or adjusted under 35 U.S.C. 154(b) by 515 days.

(21) Appl. No.: 12/342,401

(22) Filed: Dec. 23, 2008

(51) Int. Cl.
*F03G 7/00* (2006.01)

(52) U.S. Cl. ........................................ 60/641.2

(58) Field of Classification Search ....... 60/641.2–641.4
See application file for complete search history.

(56) References Cited

U.S. PATENT DOCUMENTS

| | | | |
|---|---|---|---|
| 5,515,679 A * | 5/1996 | Shulman | 60/641.2 |
| 6,668,554 B1 * | 12/2003 | Brown | 60/641.2 |
| 6,708,494 B1 * | 3/2004 | Hamann | 60/641.3 |
| 2006/0130480 A1 * | 6/2006 | Lovelace | 60/641.2 |

* cited by examiner

*Primary Examiner* — Hoang Nguyen

(57) ABSTRACT

The present invention is a heat recovery fluid to be used in a closed loop, hot dry rock system, where the fluid remains in a liquid state flowing down from the surface in an annular, downflow conduit to a terminal end heat exchanger. At the terminal end heat exchanger, the heat recover fluid partially vaporizes as a result of indirect heat transfer locally from the geological formation, resulting in a dual-phase fluid or vapor stream flowing out from the terminal end heat exchanger to an axial, return upflow conduit. In one embodiment, the upflow conduit is separated by a single wall from the downflow conduit. When the upflow conduit bears a dual-phase fluid, it has been found that the degree of vaporization of the heat transfer fluid does not result in substantial separation of the vapor and remaining liquid, i.e., which could result in plugging or slug flow in a sloping upward direction, but instead produces a stable flow regime for return of the heated heat recovery fluid to the surface. At the surface, vapor is separated from a liquid phase of the heat transfer fluid from the upflow conduit or is directed as a single vapor stream. Said vapor phase stream can be used directly in a turbine or said separated liquid and vapor phases can indirectly transfer heat to a water or light hydrocarbon liquid, vaporizing it as a working fluid for driving a turbine for electrical power production.

6 Claims, 1 Drawing Sheet

CLOSED LOOP, HOT DRY ROCK HEAT RECOVERY FLUID

FIELD OF THE INVENTION

The present invention relates to a closed loop, hot dry rock system of heat recovery from geological formations for production of other forms of energy.

BACKGROUND OF THE INVENTION

Recovery of heat from underground resources is currently commercially practiced in one of three main technological areas, i.e., power plants using dry steam, flash steam, and binary systems. Factors controlling selection of one of these technologies for a selected site include temperature, depth, and quality of the water and steam in the area. In all these cases, condensed steam and/or geothermal fluid is injected back into the ground to recover heat. In some locations, a natural supply of water produces steam from magma deposits is exhausted and processed waste water may be injected to replenish the supply.

A disadvantage with current, installed technology for geothermal heat recovery in that many geothermal are operated with excessive injection of fluids to recover the heat and thereby cool the resource. Conservative management to avoid such a result results in a failure to recover substantial heat resources. Current, installed technologies suffer a further disadvantage, in that injection of fluids, both liquid and gas, into the geological formation necessarily disrupts to a greater or lesser degree the structure of the formation. The disruption can result in surface subsidence and/or a severe re-structuring of the formation in a manner that impairs the heat resource.

Therefore, current, installed technologies substantially endanger the heat resource they attempt to recover. Notwithstanding their disadvantages, a brief description is made of the three geothermal heat recovery listed above. A dry steam power plant uses an underground resource where dry steam, without entrained water droplets, is obtained and delivered at above 235° C. (455° F.) to a surface steam turbine to produce electricity. In contrast, a flash steam power plant delivers to surface process equipment hot liquid water above 182° C. (360° F.). Liquid water is flashed into a vessel, where flashed steam is delivered to a steam turbine to produce electricity. Binary-cycle power plants recover liquid water at from 107 to 182° C. (225-360° F.) at a surface facility to indirectly transfer heat in heat exchangers to iso-butane or iso-pentane, which are vaporized and power a turbine.

A fourth technology has not been extensively practiced, in that the depth at which geothermal heat is recovered exceeds those of the above technologies. Hot dry rock systems (1) locate terminal end heat exchanger in a geological formation connected with a closed loop with a heat recovery liquid or (2) inject liquid water into the formation and recover steam in the same or different conduits. A hot dry rock system has many advantages over the others, as it can be used anywhere, not just in tectonically active regions with sufficient water present in the formation.

Of the above technologies for recovering heat from a geological formation, only one will not potentially adversely affect land stability in the surrounding region and/or cause damage to the geological formation. The closed loop, hot dry rock system is the only technology which does not continuously inject liquids into the formation, liquids which explosively expand on introduction into the formation. Such continuous and violent expansion of gases in the vicinity of injection conduits can result in damage to natural flow paths of gases within the formation, potentially closing off wells drilled to recover the vaporized liquids. The use of a closed loop, hot dry rock system necessarily results in a longer-lived and more easily managed heat resource than the other technologies described above.

Thus, there is a need for a closed loop, hot dry rock system which is economically competitive with other technologies and which obtains the substantial benefits of geothermal heat recovery without injection of liquid or gases into the geological formation containing the heat resource. Geothermal formations can provide heat for many decades but using injection-dependent heat recovery technologies can eventually cause a geological formation to cool down to temperatures below which energy production is no longer feasible. This may mean that a specific geothermal location can undergo depletion. Predictive calculations for depletion of heat from a specific location are not presently absolutely accurate, meaning that recovery of investment using injection technologies is necessarily more risky that using a more controllable and predictable closed loop, hot dry rock system.

A key characteristic of a hot dry rock system is that it may often require drilling to at least 10 km. Current drilling technology has improved so that reaching this depth is now routine for the oil industry. Exxon has produced an 11 km production well at the Chayvo field in Sakhalin, Russia.

Some geothermal power plant capital costs are generally constant regardless of the technology and include the cost of land and physical plant, including buildings and power-generating turbines. Resistance to installation of closed loop, hot dry rock systems has been based primarily on an installed cost of prior art devices and equipment to reach deeper geological formations. A closed loop, hot dry rock system which reduces such aspects as pipe diameters and conduit cost per unit length can dramatically affect the overall cost of the project, considering the depths which will be typically reached by the terminal end heat exchangers of the system. There is a need for such improvements. Geothermal power plant lifetimes are typically over thirty years, wherein cost recovery is planned for the first fifteen years of operation. However, those metrics in the near future will change dramatically where energy costs appear to have no upper limit and where energy usage for most of the world's population is predicted to expand to many times the current levels. Even now, there is a strain on our ability to deliver such energy. A closed loop, hot dry rock system incorporating the present invention can soon become the technology of choice in those circumstances.

SUMMARY OF THE INVENTION

The present invention is a heat recovery fluid to be used in a closed loop, hot dry rock system, where the fluid remains in a liquid state flowing down from the surface in an annular, downflow conduit to a terminal end heat exchanger. At the terminal end heat exchanger, the heat recover fluid partially vaporizes as a result of indirect heat transfer locally from the geological formation, resulting in a dual-phase fluid or vapor stream flowing out from the terminal end heat exchanger to an axial, return upflow conduit. In one embodiment, the upflow conduit is separated by a single wall from the downflow conduit. When the upflow conduit bears a dual-phase fluid, it has been found that the degree of vaporization of the heat transfer fluid does not result in substantial separation of the vapor and remaining liquid, i.e., which could result in plugging or slug flow in a sloping upward direction, but instead produces a stable flow regime for return of the heated heat recovery fluid to the surface. At the surface, vapor is separated from a liquid phase of the heat transfer fluid from the upflow conduit or is directed as a single vapor stream. Said vapor phase stream can be used directly in a turbine or said separated liquid and vapor phases can indirectly transfer heat to a water or light hydrocarbon liquid, vaporizing it as a working fluid for driving a turbine for electrical power production.

The choice of heat recovery fluid is selected to minimize cost per unit length of installed conduits and installed heat transfer surface required at a terminal end heat exchanger to obtain the objects of economic heat recovery from a geological formation. Pumping energy required for returning condensed and cooled heat recovery fluid from electrical energy production steps to the terminal end heat exchanger by way of the downflow conduit is also minimized.

The heat recovery fluid is selected from one which will remain in a liquid state until introduced into a terminal heat exchanger to vaporize at geological formation temperatures of at least 250° C. and thereafter to provide a surface working fluid vapor at 30 to 35 bars at a temperature of from 110° C. to 160° C. It is known in U.S. Pat. No. 4,044,830 to provide a closed loop, geothermal power generation system with multiple conduits extending in a single layer away from a central surface borehole, with each conduit ending in a terminal heat exchanger. However, in the '830 patent the heat transfer medium for use in the terminal heat exchangers is water, which requires a preferred embodiment of a water-containing geological formation for achieving the objects of its invention. U.S. Pat. Nos. 7,225,621 and 4,760,705, which are incorporated herein by reference, disclose a range of hydrocarbon based heat transfer fluids which are directly usable in power generation turbine systems upon vaporization. The above disclosure of requirements of the heat recovery fluid of the invention provides guidance for selection of one or more of the hydrocarbon based heat transfer fluids of the '621 and the '705 patents which will achieve the objects of the invention for heat recovery from a geological formation in a terminal heat exchanger of a closed fluid loop.

The invention geothermal system generally includes surface pressurizing means, such as a centrifugal pump or other means, for pressurizing a liquid stream of the heat recovery fluid, where the pressurized liquid heat recovery fluid is introduced into one or more formation conduits extending from the surface to a terminal heat exchanger in a geological formation. In a preferred embodiment, flow rates of the pressurized liquid heat recovery fluid to each one of the formation conduits is controlled by a control means. Control means comprise means for sensing temperature, pressure and flow rate at each formation conduit, comparing them to calculated desired flow rates for each such formation conduit, and adjusting means for control of flow rates to meet the calculated desired flow rate.

Each such stream of pressurized liquid heat recovery fluid to each formation conduit results in delivery of said stream in liquid state to a terminal heat exchanger located at a desired location in the geological formation. A vapor stream generated by indirect heat transfer with the geological formation is returned by way of the formation conduit to the surface for use in a power generation turbine, to be condensed and delivered to the pressurizing means for re-delivery to the geological formation.

Examples of preferred heat recovery fluids are [fill in the desired fluids.] The heat capacity and other thermal properties of the heat transfer fluid are well known, resulting in an ability to calculate to a high degree of precision the amount of heat removed by operation of each formation conduit and terminal heat exchanger.

An object of the invention is to provide a heat recovery fluid which reduces the cost and complexity of a closed loop, hot dry rock heat recovery system for a geological formation at from 4,000 to 10,000 meters depth from the surface.

DETAILED DESCRIPTION OF THE INVENTION

Figure 1:
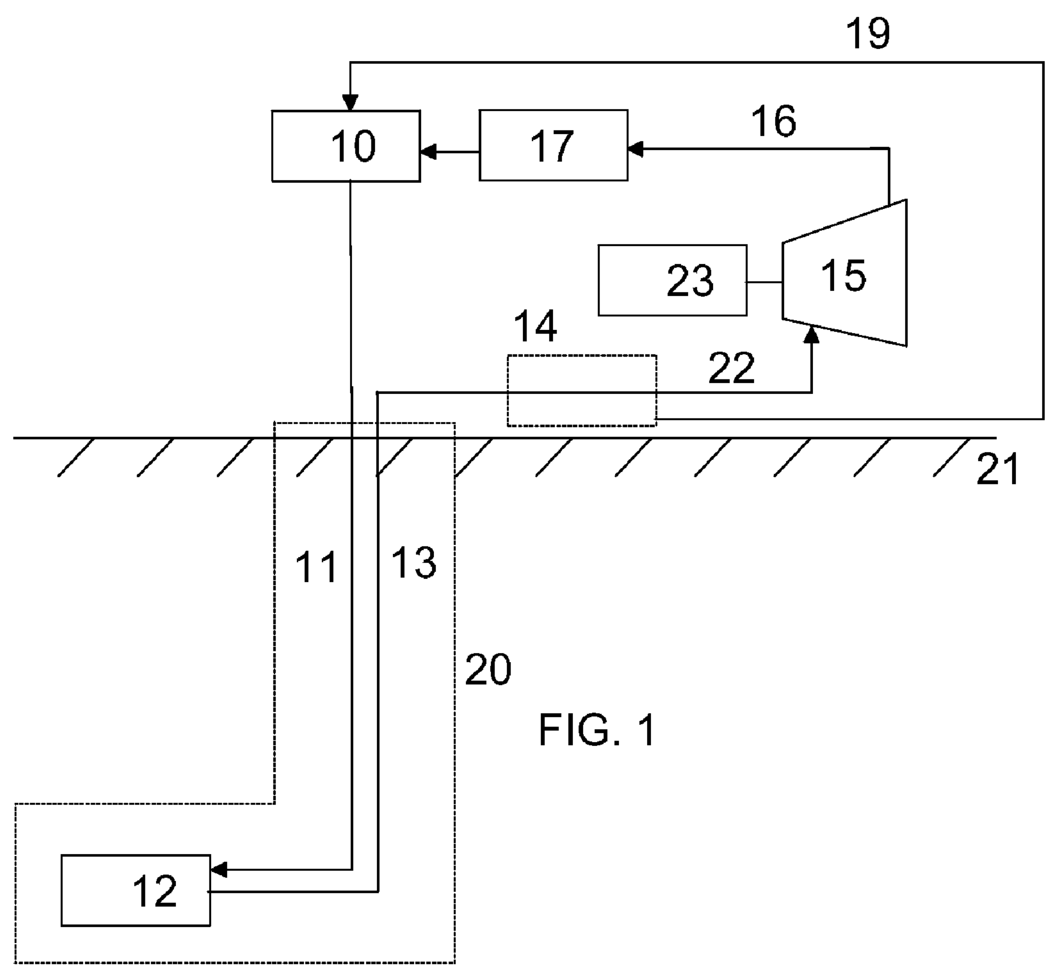
FIG. 1 is a flow diagram of the invention system.

The invention is now discussed with reference to the figures.

FIG. 1 shows pressurizing and control means 10 receiving liquid heat recovery fluid stream 19 for pressurizing and distribution to one or more sets of heat recovery units 20 comprising a formation conduit comprising a downflow conduit 11, a terminal heat exchanger 12 and an upflow conduit 13, which rise above ground level 21. Pressurizing and control means 10 deliver a calculated and desired flow rate of a liquid heat recovery fluid via down flow conduit 11 to terminal heat exchanger 12, where indirect heat transfer with the geological formation at 4,000 meters or more results in partial or total vaporization of the heat recovery fluid and delivery to the surface via upflow conduit 13. Where the heat recovery fluid has been partially vaporized, separator 14 separates a vapor stream 22 from liquid stream 19, and delivery of vapor stream 22 to turbine 15 for generation of power at generator 23. Partly condensed stream 16 of the heat transfer fluid is fully condensed at condenser 17 and delivered to pressurizing and control means 10.

In a specific example, [complete a specific example with one heat recovery liquid, including temperatures, pressures, flow rates and degree of vaporization at each step].

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A closed loop, hot dry rock heat recovery system for heat recovery from one or more heat recovery locations in a geological formation at a depth of 9,000 to 12,000 meters and having a temperature greater than or equal to 250 degrees Centigrade comprising:

(a) a hydrocarbon heat recovery fluid, consisting of water or hydrocarbon components having from four to eight carbon atoms, vaporized at a first state between 110 to 160 degrees Centigrade and between 30 to 35 bars deliverable to said geological location in a liquid state by way of one or more formation conduits;

(b) one or more heat recovery units, each comprising a formation conduit extending from a surface location to a terminal heat exchanger at a heat recovery location;

(c) each of the formation conduits comprising an axial downflow conduit and an upflow conduit annular to the downflow conduit;

(d) each terminal heat exchanger receiving a liquid stream of the heat recovery fluid at a second state through its downflow conduit from a surface pressurizing means and returning the heat transfer fluid from the terminal heat exchanger to the surface at the first state by the upflow conduit;

(e) a turbine receiving a vaporized portion of the heat recovery fluid from the upflow conduits for electrical power generation, and (f) condensing an exhaust stream of the heat recovery fluid from said turbine for condensation and delivery to the pressurizing means.

2. The system of claim 1 wherein the heat recovery fluid is fully vaporized at the surface portion of the upflow conduit.

3. The system of claim 1 wherein two or more heat recovery sets are arranged with their heat recovery locations are about the same depth from the surface.

4. The system of claim 3 wherein a control means cooperates with the pressurizing means distributes liquid heat recovery liquid to each heat recovery set independently.

5. The system of claim 1 wherein the heat recovery fluid is an iso-paraffin hydrocarbon.

6. The system of claim 1 wherein the heat recovery fluid is a hydrocarbon consisting of components having six to eight carbon atoms.

* * * * *